(12) United States Patent
Yasuda et al.

(10) Patent No.: US 8,576,314 B2
(45) Date of Patent: Nov. 5, 2013

(54) PHOTOSENSOR DEVICE

(75) Inventors: Kozo Yasuda, Mobara (JP); Toshio Miyazawa, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 324 days.

(21) Appl. No.: 13/041,645

(22) Filed: Mar. 7, 2011

(65) Prior Publication Data
US 2011/0216214 A1 Sep. 8, 2011

(30) Foreign Application Priority Data
Mar. 8, 2010 (JP) ................................. 2010-050026

(51) Int. Cl.
*H01L 31/062* (2012.01)
*H04N 3/14* (2006.01)

(52) U.S. Cl.
USPC .......................................... 348/302; 257/291

(58) Field of Classification Search
USPC ......... 348/294, 302; 250/208.1; 257/290, 291
See application file for complete search history.

(56) References Cited

U.S. PATENT DOCUMENTS

| | | | | |
|---|---|---|---|---|
| 4,797,560 A | * | 1/1989 | Berger et al. ................. | 348/309 |
| 4,980,553 A | * | 12/1990 | Henry ............................ | 250/369 |
| 5,554,849 A | * | 9/1996 | Gates ...................... | 250/370.08 |
| 6,573,504 B2 | * | 6/2003 | Iida et al. ................... | 250/338.4 |
| 6,759,657 B2 | * | 7/2004 | Iida et al. ...................... | 250/332 |
| 6,770,881 B2 | * | 8/2004 | Iida et al. ...................... | 250/332 |
| 6,809,320 B2 | * | 10/2004 | Iida et al. ................... | 250/338.4 |
| 7,087,900 B2 | * | 8/2006 | Iida et al. ...................... | 250/332 |
| 7,379,101 B2 | | 5/2008 | Mizutani et al. | |
| 7,505,070 B2 | * | 3/2009 | Kameshima et al. ......... | 348/302 |
| 7,569,820 B2 | * | 8/2009 | Iida .............................. | 250/330 |
| 7,737,400 B2 | * | 6/2010 | Funaki et al. .............. | 250/338.4 |
| 2001/0012070 A1 | * | 8/2001 | Enod et al. .................... | 348/302 |
| 2003/0090583 A1 | | 5/2003 | Mizutani et al. | |
| 2008/0251721 A1 | * | 10/2008 | Ueno ........................... | 250/332 |
| 2009/0072158 A1 | * | 3/2009 | Jung et al. ................ | 250/370.01 |
| 2013/0001426 A1 | * | 1/2013 | Tredwell et al. ......... | 250/370.09 |

FOREIGN PATENT DOCUMENTS

JP 2003-153083 5/2003

* cited by examiner

*Primary Examiner* — Timothy J Henn
(74) *Attorney, Agent, or Firm* — Antonelli, Terry, Stout & Kraus, LLP.

(57) ABSTRACT

The present invention provides a photosensor device including: a photodiode array in which photodiodes are arranged in an array shape; scanning lines which are coupled to first electrodes of the photodiodes in respective lines of the photodiode array; read lines which are coupled to second electrodes of the photodiodes in respective columns of the photodiode array; a scanning circuit which is coupled to the scanning lines and sequentially supplies a selected scanning signal to the respective scanning lines in each horizontal scanning period; and a signal processing circuit which is coupled to the read lines and loads each voltage fluctuation of the read lines in one horizontal scanning period as signal voltage when reading a signal, wherein each of the photodiodes is made of amorphous silicon or microcrystal silicon, and forward bias voltage is applied to each of the photodiodes when reading a signal.

5 Claims, 6 Drawing Sheets

PHOTOSENSOR DEVICE

BACKGROUND OF THE INVENTION

Claim of Priority

The present application claims priority from Japanese Patent Application JP 2010-050026 filed on Mar. 8, 2010, the content of which is hereby incorporated by reference into this application.

Field of the Invention

The present invention relates to a photosensor device such as a photo area sensor, and particularly to a photosensor device using photodiodes which are produced using amorphous silicon or microcrystal silicon.

Description of the Related Art

Photo area sensors are currently used in not only digital cameras, but also cell phone cameras, cell phone video cameras, fingerprint authentication apparatuses, and finger authentication apparatuses.

As these photo area sensors, CCDs and CMOS sensors are currently used. CCDs and CMOS sensors are produced using single-crystal silicon, and are excellent in sensitivity and resolution.

However, production of relatively-large area sensors results in a problem of high cost. For example, if it is tried to directly view finger veins and fingerprints without a lens, an area sensor having a size of a few centimeters is needed. Use of the photo area sensors in personal computers and cell phones as area sensors for biometric authentication leads to extremely-high cost.

Accordingly, it has been studied if it is possible to produce a low-cost sensor using, in place of single-crystal silicon, a glass substrate such as a thin-film transistor (TFT) for a base. Some sensors are put to practical use in some applications and others are not because they are poor in sensitivity.

It is difficult to produce a high-performance sensor on a glass substrate because only amorphous silicon or microcrystal silicon which is poorer in performance than single-crystal silicon is available on the glass substrate.

In order to improve sensitivity, there is a method of forming an amplifier in each pixel as in a CMOS sensor. However, if sensors are produced without single-crystal silicon, the performance of the transistor deteriorates and variations of amplifiers cannot be appropriately corrected, resulting in fixed noise.

Thus, a new measure is needed to improve the sensitivity while making the most of the characteristics of amorphous silicon or microcrystal silicon.

It has been found, by the study of the characteristics of photodiodes produced using amorphous silicon or microcrystal silicon, that each channel resistance of the photodiodes is changed by incident light.

The present invention has been achieved based on the above-described finding, and an object thereof is to provide a photosensor device that is simple in structure and can be driven with low voltage by using photodiodes produced using amorphous silicon or microcrystal silicon.

The above and other objects and novel characteristics of the present invention will become apparent from the description and accompanying drawings of the specification.

SUMMARY OF THE INVENTION

The following is a brief summary of representative aspects of the present invention disclosed in this application.

(1) A photosensor device including: a photodiode array in which a plurality of photodiodes are arranged in an array shape; a plurality of scanning lines which are coupled to first electrodes of the photodiodes in respective lines of the photodiode array; a plurality of read lines which are coupled to second electrodes of the photodiodes in respective columns of the photodiode array; a scanning circuit which is coupled to the plurality of scanning lines and sequentially supplies a selected scanning signal to the respective scanning lines in each horizontal scanning period; and a signal processing circuit which is coupled to the plurality of read lines and loads each voltage fluctuation of the read lines in one horizontal scanning period as signal voltage when reading a signal, wherein each of the photodiodes is made of amorphous silicon or microcrystal silicon, and forward bias voltage is applied to each of the photodiodes when reading a signal.

(2) In (1), the signal processing circuit resets each electric potential of the read lines to first voltage in a blanking period of one horizontal scanning period.

(3) In (2), the scanning circuit sequentially supplies a selected scanning signal at a first voltage level as forward bias voltage to the photodiodes coupled to a selected scanning line through the respective scanning lines.

(4) In any one of (1) to (3), a first voltage level period of the selected scanning signal that is sequentially supplied to the respective scanning lines from the scanning circuit is changed to change sensor sensitivity of the photosensor device.

The following is a brief summary of representative effects obtained by the present invention disclosed in this application.

According to the present invention, it is possible to provide a photosensor device that is simple in structure and can be driven with low voltage by using photodiodes produced using amorphous silicon or microcrystal silicon.

DETAILED DESCRIPTION OF THE INVENTION

Figure 1:
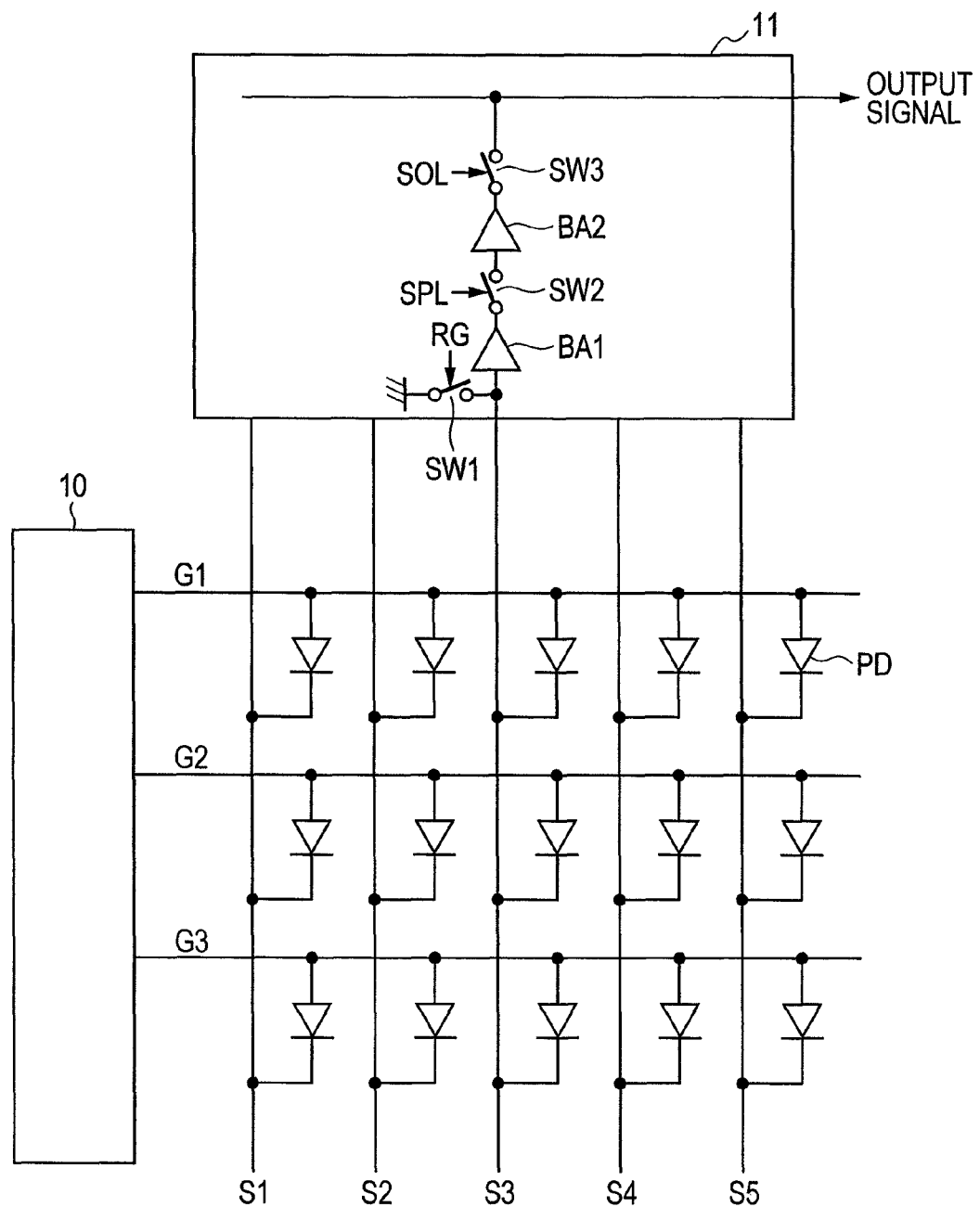
FIG. 1 is a circuit diagram for showing a circuit configuration of a photosensor device according to a first embodiment of the present invention.

Hereinafter, embodiments of the present invention will be described in detail with reference to the drawings.

It should be noted that the same reference numerals are given to constituent elements having the same functions in the all drawings used for explaining the embodiments, and the explanations thereof will not be repeated. Further, the constitution of the scope of the claims of the present invention is not limited to the following embodiments.

[First Embodiment]

FIG. 1 is a circuit diagram for showing a circuit configuration of a photosensor device according to a first embodiment of the present invention.

As shown in FIG. 1, the photosensor device of the embodiment includes a diode matrix array in which plural photodiodes PD are arranged in a matrix shape and which configures a light receiving surface, plural scanning lines (G1, G2, G3, . . . ) which are coupled to anodes of the photodiodes PD in the respective lines of the photodiode array, plural read lines (S1, S2, S3, S4, S5, . . . ) which are coupled to cathodes of the photodiodes PD in the respective columns of the photodiode array, a vertical gate driver 10 which is coupled to the respective scanning lines (G1, G2, G3, . . . ) and sequentially selects the scanning lines (G1, G2, G3, . . . ) in each horizontal scanning period, and a signal processing circuit 11 which is coupled to the respective read lines (S1, S2, S3, S4, S5, . . . ) and loads each voltage fluctuation of the read lines (S1, S2, S3, S4, S5, . . . ) in one horizontal scanning period as signal voltage for processing.

Each of the photodiodes PD is made of amorphous silicon or microcrystal silicon, and is produced on a single-crystal silicon substrate or a glass substrate.

Figure 2:
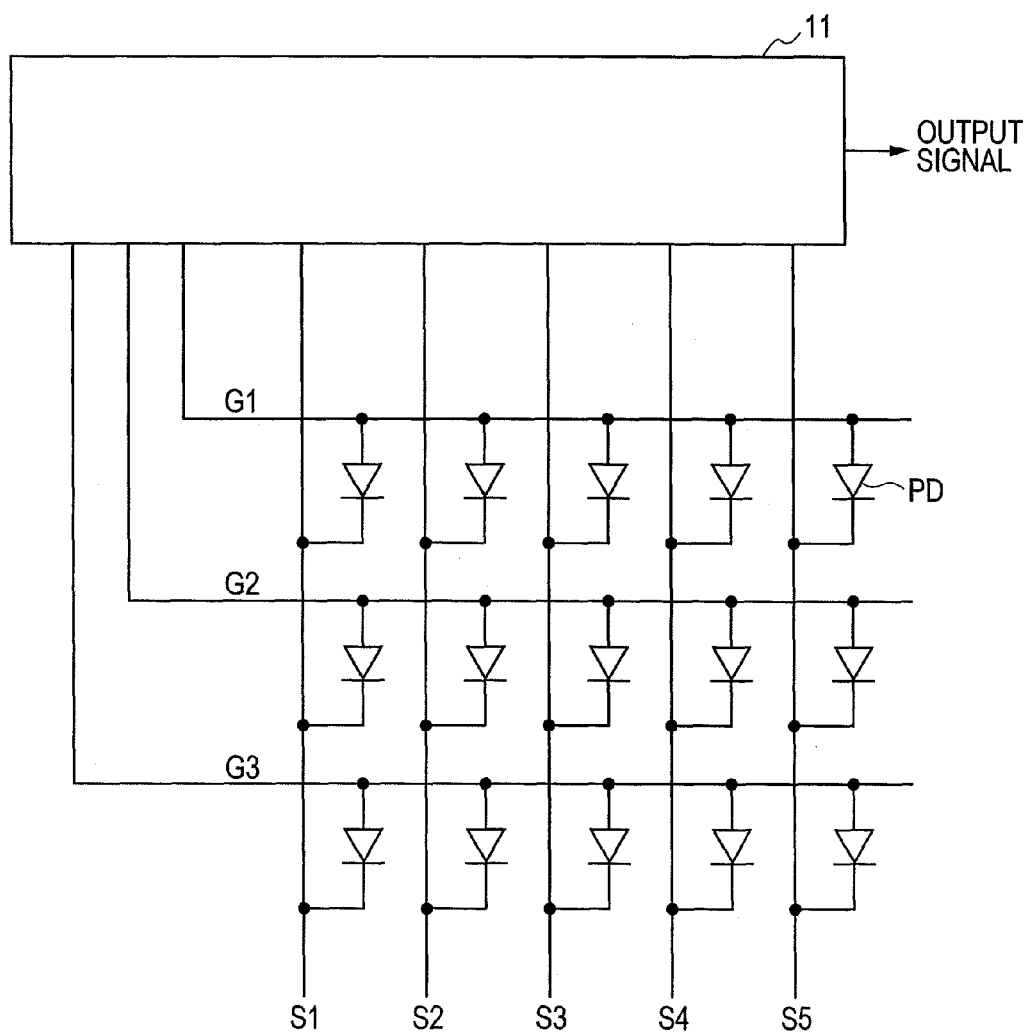
FIG. 2 is a circuit diagram for showing a circuit configuration as a modified example of the photosensor device according to the first embodiment of the present invention.

In general, the vertical gate driver 10 and the signal processing circuit 11 are configured using circuits mounted in a semiconductor chip, and are arranged on the substrate on which the diode array is produced. It should be noted that the vertical gate driver 10 and the signal processing circuit 11 may be configured using a circuit mounted in the same semiconductor chip as shown in FIG. 2.

Figure 3:
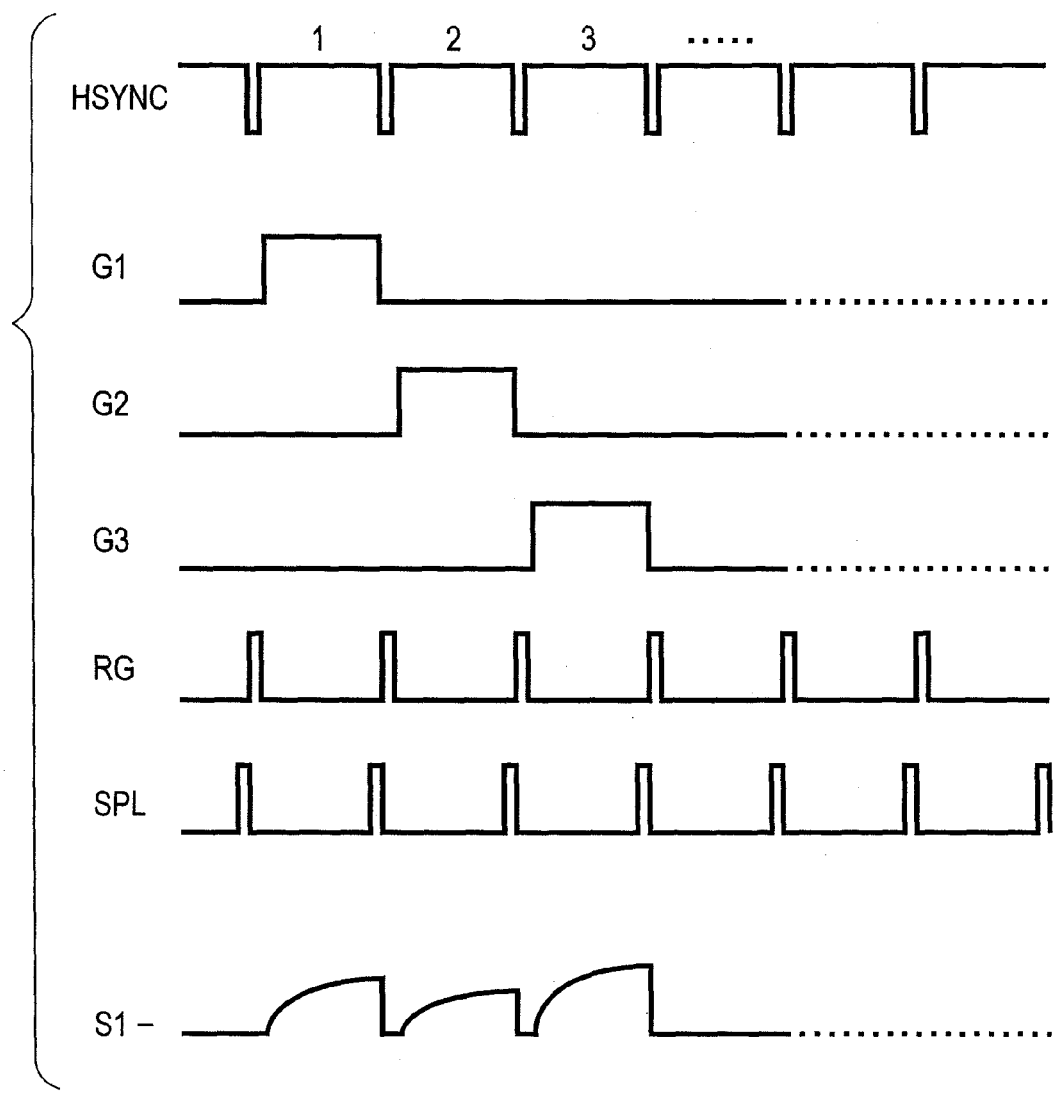
FIG. 3 is a timing view for explaining a driving method of the photosensor device according to the first embodiment of the present invention.

FIG. 3 is a timing view for explaining a driving method of the photosensor device according to the first embodiment of the present invention.

Hereinafter, the driving method of the photosensor device of the embodiment will be described using FIG. 3.

In the first place, a signal RG becomes the high level (hereinafter, referred to as H-level) and a switch circuit SW1 in the signal processing circuit 11 is turned on in a blanking period of one horizontal scanning period HSYNC. Thereby, each of the read lines (S1, S2, S3, S4, S5, . . . ) is reset, and is adjusted to constant electric potential (for example, ground potential). When the signal RG becomes the H-level, each of the scanning lines (G1, G2, G3, . . . ) becomes the low level (hereinafter, referred to as L-level).

Next, when the signal RG becomes the L-level, the voltage level of the scanning line G1 becomes the H-level. Accordingly, the photodiodes PD whose anodes are coupled to the scanning line G1 are turned on, and current flows from the scanning line G1 to the respective read lines (S1, S2, S3, S4, S5, . . . ) through the respective photodiodes PD.

Light enters the respective photodiodes PD, and each channel resistance of the photodiodes PD is changed in accordance with the incident light. Accordingly, the current that flows from the scanning line G1 to the respective photodiodes PD is changed, and is charged into the respective read lines (S1, S2, S3, S4, S5, . . . ) as electric charge. The voltage changes are read as signal voltage of the respective read lines (S1, S2, S3, S4, S5, . . . ). This state is illustrated as a read-line wave form S1~.

As described in the embodiment, each electric potential of the read lines (S1, S2, S3, S4, S5, . . . ) is adjusted to constant electric potential in accordance with the timing of the signal RG, and then is fluctuated (raised in FIG. 1) by the incident light.

Before the next signal RG becomes the H-level after one horizontal scanning period HSYNC, a signal SPL becomes the H-level, and a switch circuit SW2 in the signal processing circuit 11 is turned on. Accordingly, each electric potential of the read lines (S1, S2, S3, S4, S5, . . . ) is loaded as signal voltage into the signal processing circuit 11 through a buffer circuit BA1.

The maximum value of the signal voltage is determined on the basis of the voltage applied to the photodiodes PD, namely, the voltage of the scanning line G1 at the H-level. In consideration of the following signal processing, the signal voltage may be 1 to 2V. Alternatively, if a threshold voltage Vth of the photodiode PD is taken into account, the signal voltage may be about 3V.

For a thin-film transistor made of amorphous silicon or microcrystal silicon, a pulse voltage of 10V or higher is required. Further, a pulse voltage of about 10V is required for a CCD, and a pulse voltage of about 5V is required for a CMOS sensor. In contrast, the photodiodes of the embodiment can be driven with single voltage as low as 3V.

Thereafter, the signal RG becomes the H-level and the switch circuit SW1 in the signal processing circuit 11 is turned on in a blanking period of one horizontal scanning period HSYNC. Thereby, each of the read lines (S1, S2, S3, S4, S5, . . . ) is reset, and is adjusted to constant electric potential (for example, ground potential). Then, the scanning line G2 becomes the H-level. Accordingly, the photodiodes PD whose anodes are coupled to the scanning line G2 are turned on, and current flows from the scanning line G2 to the respective read lines (S1, S2, S3, S4, S5, . . . ) through the respective photodiodes PD. In the following steps, the signal voltage is loaded in the same manner as described above.

For the scanning lines G3, G4 . . . , the signal voltage is loaded by the same process.

Further, the signal voltage loaded in parallel to the signal processing circuit 11 is sequentially output from the signal processing circuit 11 through a buffer circuit BA2 by a signal SOL which sequentially becomes the H-level in one horizontal scanning period HSYNC.

[Second Embodiment]

Figure 4:
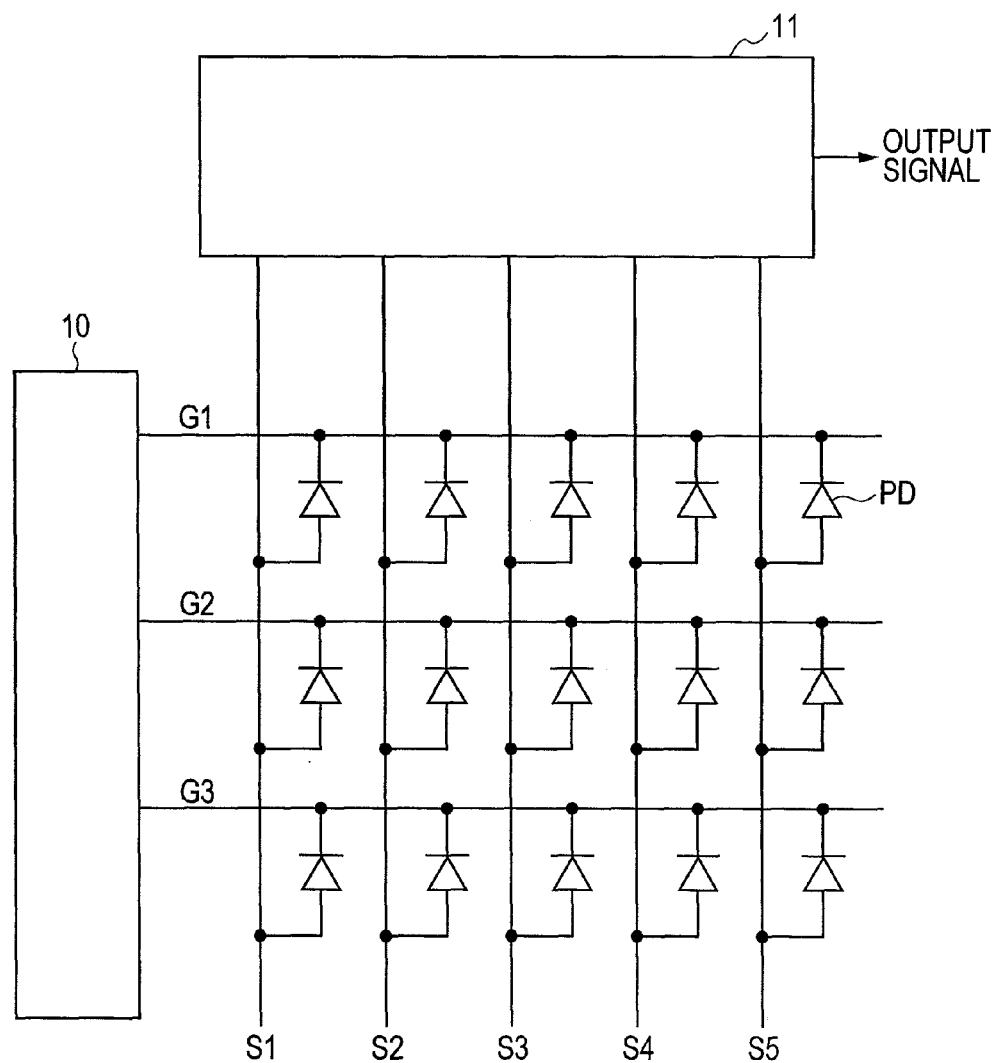
FIG. 4 is a circuit diagram for showing a circuit configuration of a photosensor device according to a second embodiment of the present invention.

FIG. 4 is a circuit diagram for showing a circuit configuration of a photosensor device according to a second embodiment of the present invention.

In the embodiment, the polarities of the photodiodes PD in the first embodiment are inversed. In this case, the polarities of the driving voltage and the signal voltage are also inversed.

Specifically, when the signal RG becomes the H-level and the switch circuit SW1 in the signal processing circuit 11 are turned on in a blanking period of one horizontal scanning period HSYNC, each of the read lines (S1, S2, S3, S4, S5, . . . ) is adjusted to, for example, electric potential at the H-level in a driving method of the photosensor device of the embodiment.

Further, during a period when the signal RG is at the H-level, each voltage level of the scanning lines (G1, G2, G3, . . . ) becomes the H-level. When the signal RG becomes the L-level, each voltage level of the scanning lines (G1, G2, G3, . . . ) becomes the L-level.

Accordingly, the photodiodes PD whose cathodes are coupled to a selected scanning line are turned on, and current flows from the respective read lines (S1, S2, S3, S4, S5, . . . ) to the selected scanning line through the respective photodiodes PD.

Light enters the respective photodiodes PD, and each channel resistance of the photodiodes PD is changed in accordance with the incident light. Accordingly, the current that flows from the respective read lines (S1, S2, S3, S4, S5, . . . )

to the selected scanning line through the respective photodiodes PD is changed, and each electric potential of the read lines (S1, S2, S3, S4, S5, . . . ) is reduced.

Accordingly, the reduction in each electric potential of the read lines (S1, S2, S3, S4, S5, . . . ) is read as each signal voltage of the read lines (S1, S2, S3, S4, S5, . . . ) in the embodiment.

[Third Embodiment]

Figure 5:
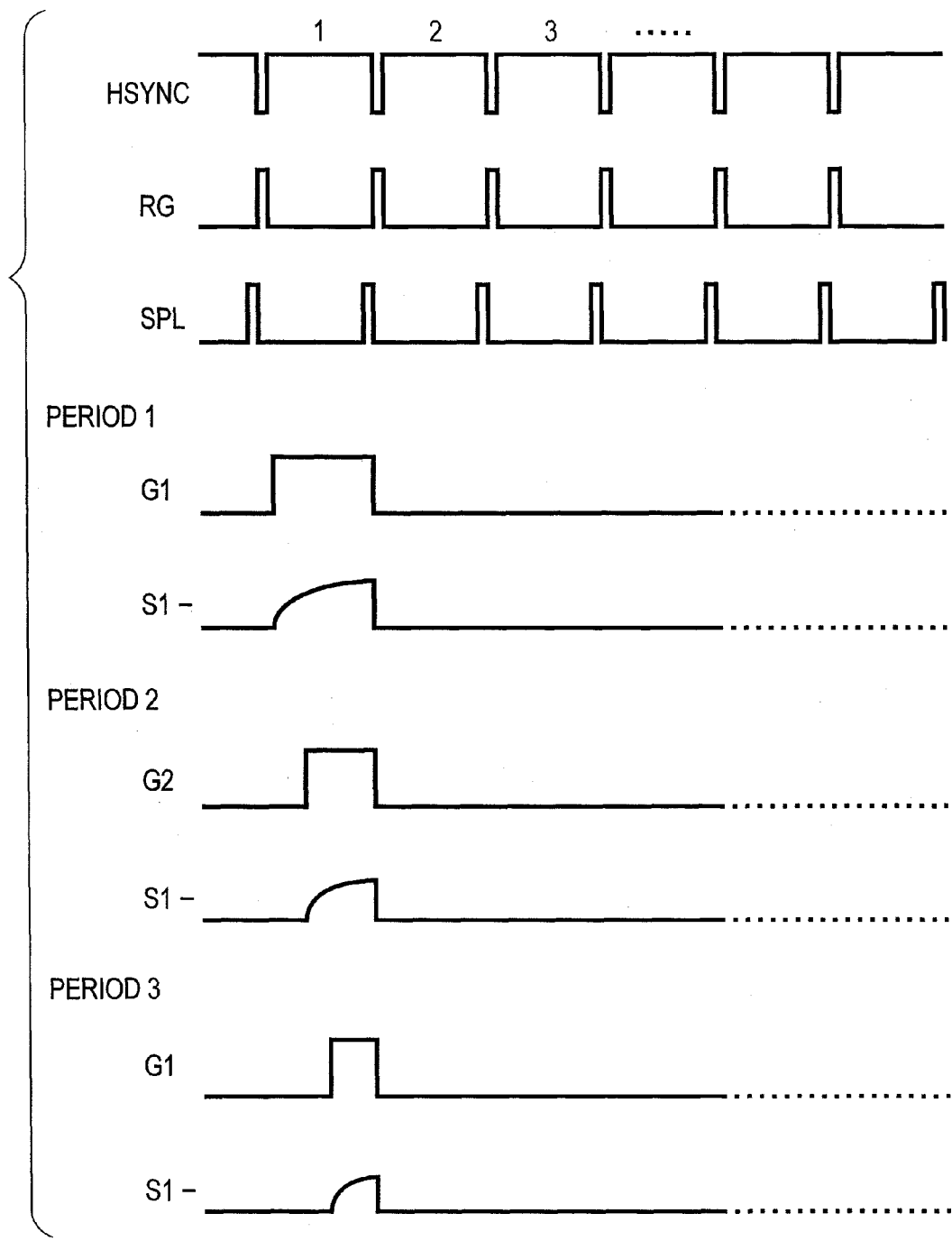
FIG. 5 is a timing view for explaining a driving method of a photosensor device according to a third embodiment of the present invention.

FIG. 5 is a timing view for explaining a driving method of a photosensor device according to a third embodiment of the present invention.

In the embodiment, the sensitivity varies by changing the selection period (the H-level period in FIG. 3) of each of the scanning lines (G1, G2, G3, . . . ) in the first embodiment.

It should be noted that only the scanning line G1 is illustrated in FIG. 5. However, the same is true for the other scanning lines. Further, the signal RG used to reset each voltage of the read lines (S1, S2, S3, S4, S5, . . . ) and the signal SPL used to load a signal are the same as those in the first embodiment.

In a period 1 of FIG. 5, the H-level period of the scanning line G1 corresponds to one horizontal scanning period HSYNC, and the rising time of each electric potential of the read lines (S1, S2, S3, S4, S5, . . . ) is longest. Therefore, the signal voltage loaded to the signal processing circuit 11 becomes highest, resulting in the best sensitivity.

On the contrary, in a period 2, the H-level period of the scanning line G1 becomes shorter than that in the period 1. As a result, the rising time of each electric potential of the read lines (S1, S2, S3, S4, S5, . . . ) becomes shorter. Therefore, the signal voltage loaded to the signal processing circuit 11 becomes lower than that in the period 1, and thus the sensitivity is reduced.

In addition, in a period 3, the H-level period of the scanning line G1 becomes much shorter. As a result, the rising time of each electric potential of the read lines (S1, S2, S3, S4, S5, . . . ) becomes much shorter. Therefore, the signal voltage loaded to the signal processing circuit 11 becomes lower than that in the period 2, and thus the sensitivity is further reduced.

As described above, by changing the selection period (the H-level period in FIG. 3) of each of the scanning lines (G1, G2, G3, . . . ), the sensitivity of the signal voltage can be adjusted, and the dynamic range can be widened.

Figure 6:
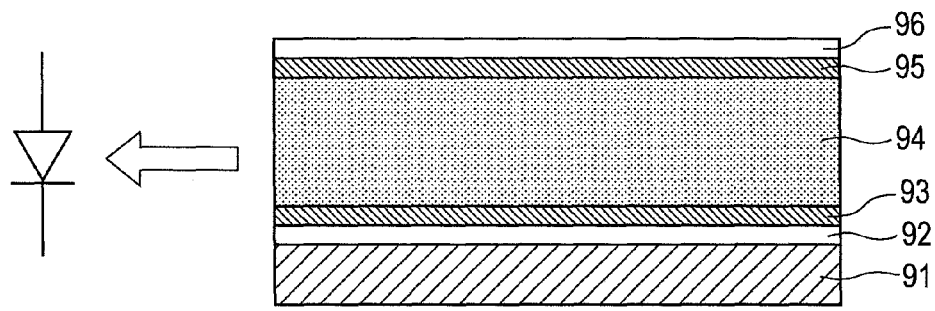
FIG. 6 is a diagram for explaining an example of an amorphous silicon photodiode used in each embodiment of the present invention.

FIG. 6 is a diagram for explaining an example of an amorphous silicon photodiode used in each embodiment of the present invention.

In FIG. 6, the reference numeral 91 denotes a substrate such as a glass substrate, the reference numerals 92 and 96 denote metal electrodes, the reference numeral 93 denotes an n-type amorphous silicon layer, the reference numeral 94 denotes an i-type amorphous silicon layer, and the reference numeral 95 denotes a p-type amorphous silicon layer. It should be noted that an equivalent circuit of the amorphous silicon photodiode having the structure shown in FIG. 6 is shown together.

According to the embodiments, each of the photodiodes can be made of amorphous silicon or microcrystal silicon, and the photo area sensor can be produced on, for example, a glass substrate as described above. Thus, it is possible to produce a large-area photosensor device that is less expensive as compared to an existing CCD and CMOS sensor.

Further, the photosensor device of each embodiment is simple in structure, and can be driven with low voltage. Further, the photosensor device of each embodiment is advantageously high in sensitivity and dynamic range.

The invention achieved by the inventors has been concretely described above on the basis of the embodiments. However, it is obvious that the present invention is not limited to the embodiments, and may be variously changed without departing from the scope of the present invention.

What is claimed is:

1. A photosensor device comprising:
    a photodiode array in which a plurality of photodiodes are arranged in an array shape;
    a plurality of scanning lines which are coupled to first electrodes of the photodiodes in respective lines of the photodiode array;
    a plurality of read lines which are coupled to second electrodes of the photodiodes in respective columns of the photodiode array;
    a scanning circuit which is coupled to the plurality of scanning lines and sequentially supplies a selected scanning signal to the respective scanning lines in each horizontal scanning period; and
    a signal processing circuit which is coupled to the plurality of read lines and loads each voltage fluctuation of the read lines in one horizontal scanning period as signal voltage when reading a signal;
    wherein each of the photodiodes is made of amorphous silicon or microcrystal silicon;
    wherein a forward bias voltage is applied to each of the photodiodes when reading a signal; and
    wherein a first voltage level period of the selected scanning signal that is sequentially supplied to the respective scanning lines from the scanning circuit is changed to change sensor sensitivity of the photosensor device.

2. The photosensor device according to claim 1, wherein the signal processing circuit resets each electric potential of the read lines to first voltage in a blanking period of one horizontal scanning period.

3. The photosensor device according to claim 2, wherein the scanning circuit sequentially supplies a selected scanning signal at a first voltage level as forward bias voltage to the photodiodes coupled to a selected scanning line through the respective scanning lines.

4. The photosensor device according to claim 1,
    wherein the signal processing circuit and the scanning circuit are mounted in the same semiconductor chip, and
    the semiconductor chip is mounted on a substrate on which the photodiode array is formed.

5. The photosensor device according to claim 1,
    wherein the signal processing circuit and the scanning circuit are mounted in two semiconductor chips which are different from each other, and
    the two semiconductor chips are mounted on a substrate on which the photodiode array is formed.

* * * * *